(12) United States Patent
Ghosh et al.

(10) Patent No.: US 9,578,527 B2
(45) Date of Patent: Feb. 21, 2017

(54) METHOD AND APPARATUS FOR RECEIVING UPLINK SIGNALS

(71) Applicant: NOKIA SOLUTIONS AND NETWORKS OY, Espoo (FI)

(72) Inventors: Amitabha Ghosh, Buffalo Grove, IL (US); Bishwarup Mondal, Beavercreek, OH (US); Rapeepat Ratasuk, Hoffman Estates, IL (US); Weidong Yang, Hoffman Estates, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 26 days.

(21) Appl. No.: 14/356,659

(22) PCT Filed: Nov. 6, 2012

(86) PCT No.: PCT/EP2012/071906
§ 371 (c)(1),
(2) Date: May 7, 2014

(87) PCT Pub. No.: WO2013/068335
PCT Pub. Date: May 16, 2013

(65) Prior Publication Data
US 2014/0301278 A1 Oct. 9, 2014

Related U.S. Application Data

(60) Provisional application No. 61/556,349, filed on Nov. 7, 2011.

(51) Int. Cl.
*H04W 4/00* (2009.01)
*H04W 24/08* (2009.01)
*H04W 28/06* (2009.01)
*H04B 7/02* (2006.01)

(52) U.S. Cl.
CPC ............. *H04W 24/08* (2013.01); *H04B 7/024* (2013.01); *H04W 28/06* (2013.01)

(58) Field of Classification Search
CPC ....... H04W 28/06; H04W 24/08; H04B 7/024; H04B 7/0639
USPC .......................................................... 370/329
See application file for complete search history.

(56) References Cited

U.S. PATENT DOCUMENTS

| | | | |
|---|---|---|---|
| 2009/0116389 A1* | 5/2009 | Ji | H04W 28/16 370/235 |
| 2011/0081145 A1* | 4/2011 | Burrell | H04L 12/413 398/41 |
| 2012/0014269 A1* | 1/2012 | Ray | H04W 74/006 370/252 |

FOREIGN PATENT DOCUMENTS

WO WO 2011/042977 A1 4/2011

OTHER PUBLICATIONS

International Search Report dated Feb. 18, 2013 corresponding to International Patent Application No. PCT/EP2012/071906.
(Continued)

*Primary Examiner* — Sai-Ming Chan
(74) *Attorney, Agent, or Firm* — Squire Patton Boggs (US) LLP

(57) ABSTRACT

A method comprises determining in a first network element how much of a received uplink transmission is to be transmitted to a second network element, said first and second network elements both receiving said uplink transmission; and causing at least part of said received uplink transmission to be transmitted to said second network element.

17 Claims, 7 Drawing Sheets

(56) References Cited

OTHER PUBLICATIONS

I2R: "Opportunistic Coordinated Multi-Point Reception for Multi-Codeword Uplink Transmission," 3GPP Draft; R1-112455, 3rd Generation Partnership Project (3GPP); 3GPP TSG RAN WG1 Meeting #66, Athens, Greece, Aug. 16, 2011, XP050537548, 6 pages.

Pantech & Curitel: "On the Management of Backhaul Link in the Uplink Multipoint Reception," 3GPP Draft; R1-093797, 3GPP TSG-RAN WG1 #58bis, Oct. 12, 2009, Miyazaki, Japan, XP050388313, 3 pages.

3GPP TS 36.300 V8.12.0 (Mar. 2010), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 8), Mar. 2010, 149 pages.

3GPP TS 36.300 V9.7.0 (Mar. 2011), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 9), Mar. 2011, 174 pages.

3GPP TS 36.300 V10.4.0 (Jun. 2011), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 10), Jun. 2011, 194 pages.

3GPP TS 36.913 V8.0.1 (Mar. 2009), Technical Specification, 3rd Generation Partnership Project; Technical Specification Group Radio Access Network; Requirements for further advancements for Evolved Universal Terrestrial Radio Access (E-UTRA) (Lte-Advanced) (Release 8), Mar. 2009, 15 pages.

3GPP TS 36.913 V9.0.0 (2009-12), Technical Specification, 3rd Generation Partnership Project; Technical Specification Group Radio Access Network; Requirements for further advancements for Evolved Universal Terrestrial Radio Access (E-UTRA) (LTE-Advanced) (Release 9), Dec. 2009, 15 pages.

3GPP TS 36.913 V10.0.0 (Mar. 2011), Technical Specification, 3rd Generation Partnership Project; Technical Specification Group Radio Access Network; Requirements for further advancements for Evolved Universal Terrestrial Radio Access (E-UTRA) (LTE-Advanced) (Release 10), Mar. 2011, 15 pages.

3GPP TS 23.401 V8.10.0 (Jun. 2010), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 8), Jun. 2010, 242 pages.

\* cited by examiner

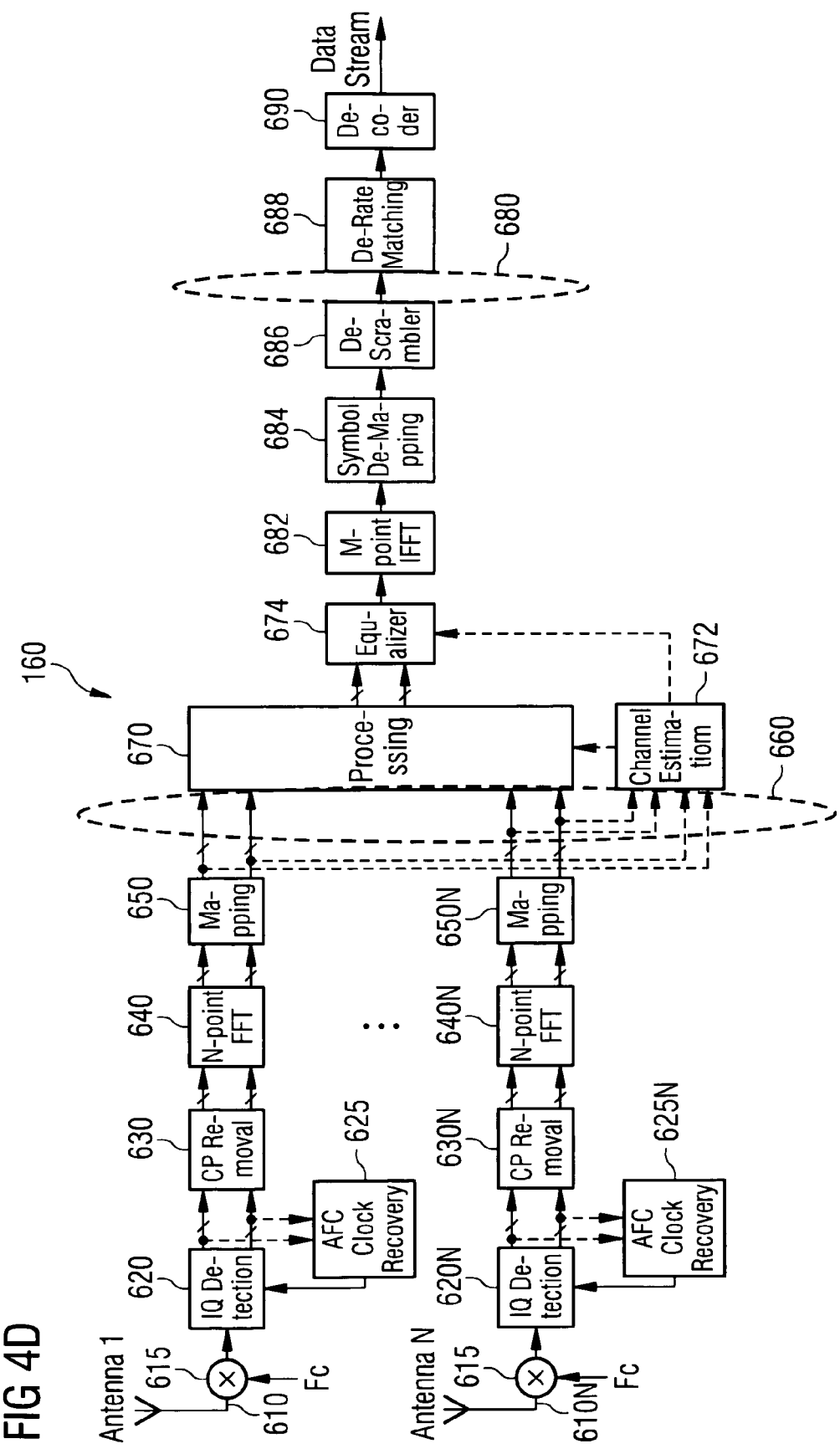

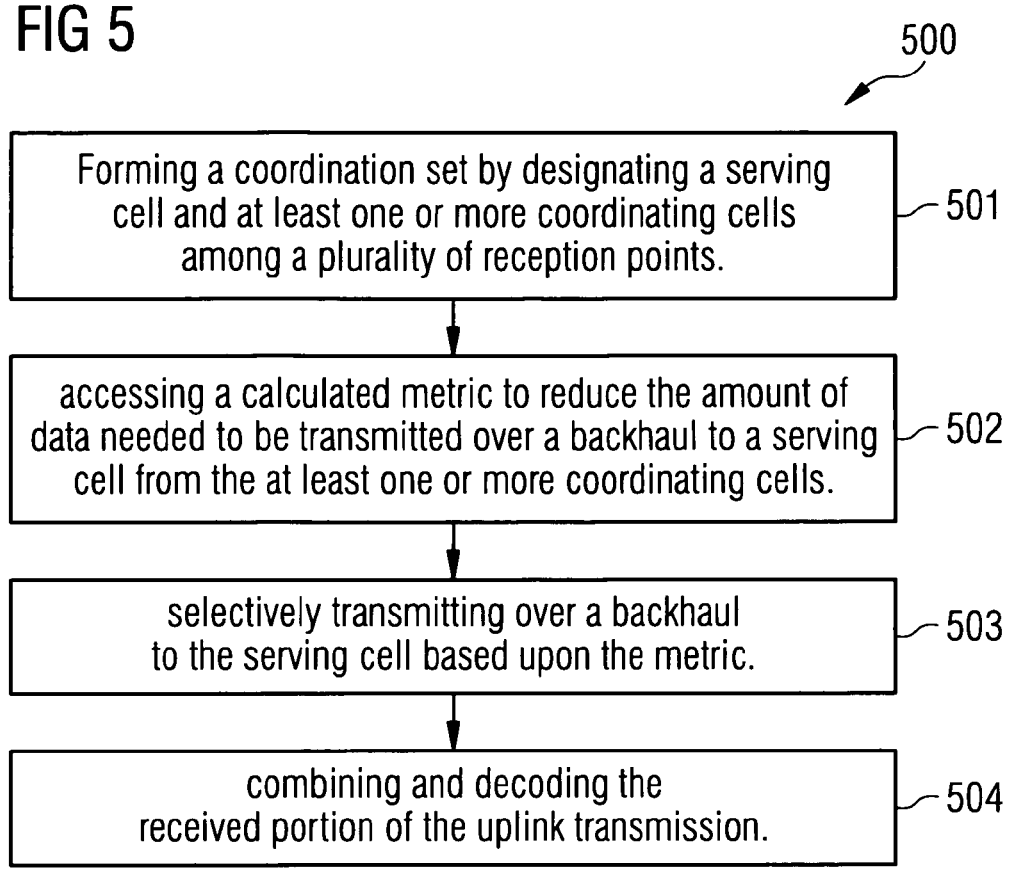
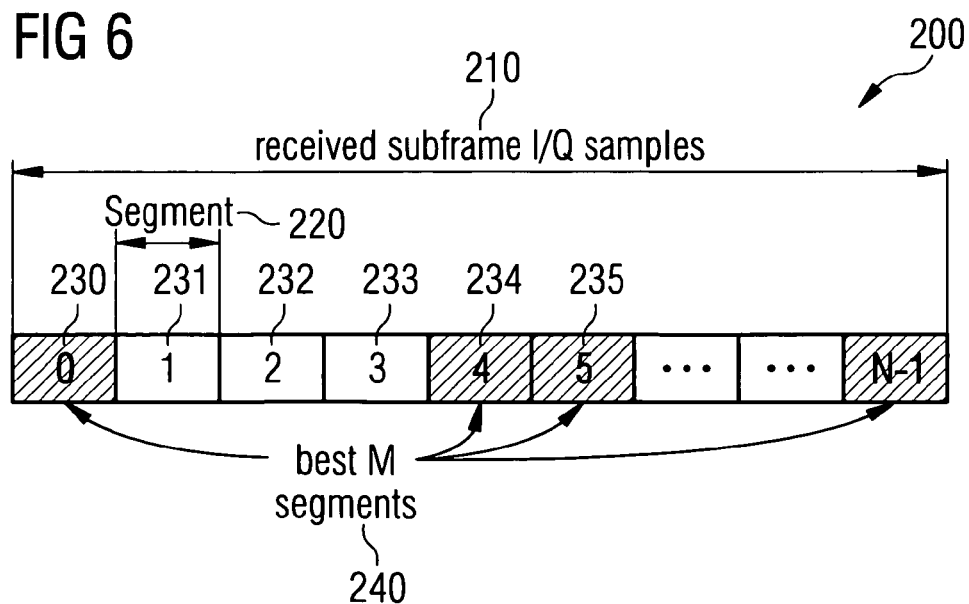

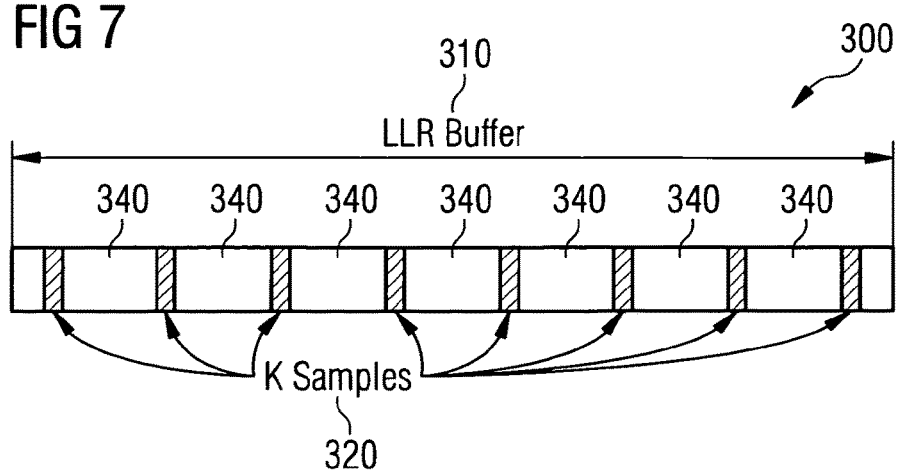
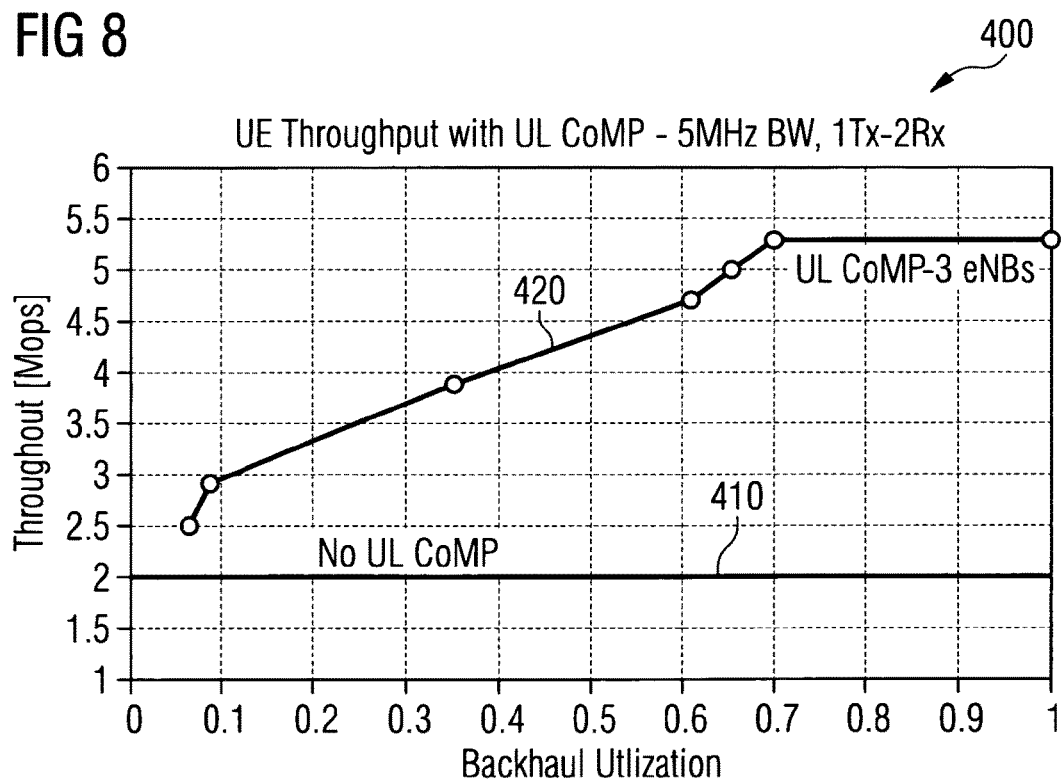

METHOD AND APPARATUS FOR RECEIVING UPLINK SIGNALS

TECHNICAL FIELD

This disclosure relates generally to wireless communication systems, methods, apparatus and computer programs and, in particular but not exclusively to reducing the amount of coordinated multipoint transmissions over a backhaul.

BACKGROUND

This section is intended to provide a background or context to some embodiments. The description herein may include concepts that could be pursued, but are not necessarily ones that have been previously conceived, implemented or described. Therefore, unless otherwise indicated herein, what is described in this section is not prior art to the description in this application and is not admitted to be prior art by inclusion in this section. Enhancements to mobile communication system are currently being investigated to improve the experience of mobile users who use those systems. In particular, the investigation has focused on enhancing the enjoyment by providing consistent performance and quality when mobile users access and share videos, photos and other high-bandwidth services, whether they are close to the center of an long term evolution advanced (LTE-A) cell or at its outer edges. Currently, the emphasis has been placed on enhancing downlink (DL) transmissions while ignoring enhancements to uplink (UL) reception in such edge transmission/reception improving solutions. Moreover, solutions to date involving coordination among UL reception points have required an additional backhaul infrastructure needed to transfer data among the different reception points and which may require significant bandwidth.

The following abbreviations that may be found in the specification and/or the Figures are defined as follows:

3GPP third generation partnership project
AFC Automatic frequency control
BS base station
BW bandwidth
CM cubic metric
CoMP coordinated multi-point
CQI channel quality indication
CP Cyclic Prefix
CRS common reference signal
CS cyclic shift
CSI channel state information
DCI downlink control information
DL downlink (eNB towards UE)
DMRS demodulation reference signal
eNB E-UTRAN Node B (evolved Node B)
EPC evolved packet core
E-UTRAN evolved UTRAN (LTE)
FDMA frequency division multiple access
FFT Fast Fourier Transformation
HSPA high speed packet access
IFDM interleaved frequency-division multiplexing
IMT-A international mobile telephony-advanced
ITU international telecommunication union
ITU-R ITU radio communication sector
LLR Log-Likelihood Ratio
LTE long term evolution of UTRAN (E-UTRAN)
LTE-A LTE advanced
MAC medium access control (layer 2, L2)
MIMO multiple input multiple output
MM/MME mobility management/mobility management entity
MU-MIMO multi-user multiple input multiple output
Node B base station
OCC orthogonal cover code
OFDMA orthogonal frequency division multiple access
O&M operations and maintenance
PDCCH packet downlink control channel
PDCP packet data convergence protocol
PHY physical (layer 1, L1)
PMI precoding matrix indication
PRB physical resource block
PUCCH physical uplink control channel
PUSCH physical uplink shared channel
RAN1 technical specification group radio access network working group 1
Rel release
RLC radio link control
RRC radio resource control
RRH remote radio head
RRM radio resource management
S-GW serving gateway
SC-FDMA single carrier, frequency division multiple access
TPMI transmit precoding matrix index
UE user equipment, such as a mobile station, mobile node or mobile terminal
UL uplink (UE towards eNB)
UTRAN universal terrestrial radio access network

SUMMARY

According to an aspect, there is provided a method comprising: determining in a first network element how much of a received uplink transmission is to be transmitted to a second network element, said first and second network elements both receiving said uplink transmission; and causing at least part of said received uplink transmission to be transmitted to said second network element.

The determining may comprise using information from at least one of said first and second network elements to determine how much of said received uplink transmission is to be transmitted The determining may comprise using a metric to determine how much of said received uplink transmission is to be transmitted The determining may comprise determining a metric and using said metric to determine how much of said received uplink transmission is to be transmitted.

The determining may comprise determining which of a plurality subframes of said received transmission is to be transmitted to a second network element.

The causing may comprise causing information to be transmitted, said information indicating which part of said received uplink transmission is to be transmitted to said second network element.

The second network element may comprise a serving cell.

The said metric may comprise at least one of: one or more subframe performance metrics; one or more of user equipment performance metrics; one or more of a backhaul capacity and utilization rate; and a number of network elements sending the received uplink transmission to the second network element.

One or more of the subframe performance metrics may comprise at least one of: a signal to noise ratio; a log-likelihood ratio; and path loss ratio at the second network element and said first network element.

One or more of the user equipment performance metrics may comprise an interference level and/or a path loss at the second network element and/or the first network element.

The method may comprise processing the received uplink transmission into N samples, and said determining comprises determining that M samples are to be transmitted to said second network element, where M is less than N.

The method may comprise receiving M from said second network element.

The method may comprise determining M at said first network element in dependence on a quality of said received transmission.

The determining may comprise determining a quality of said received uplink transmission; and causing all of said received uplink transmission to be transmitted to said second network element in dependence of said determined quality.

According to another aspect, there is provided a method comprising: transmitting by a second network element information to a first network element, said first and second network elements both receiving an uplink transmission, said information determining how much of said uplink transmission is to be provided by said first network element to said second network element; and receiving at least a portion of said uplink transmission from said first network element.

The method may comprise combining said at least a portion of said uplink transmission from said first network element with at least a portion of said uplink transmission received by said second network element.

Any of the methods may be performed in an apparatus. The apparatus may be a network element. The network element may be a base station.

According to another aspect, there is provided a computer program comprising computer executable instructions which when run cause any of the above methods to be performed.

According to another aspect, there is provided an apparatus comprising at least one processor and at least one memory including computer code for one or more programs, the at least one memory and the computer code configured, with the at least one processor, to cause the apparatus at least to: determine in a first network element how much of a received uplink transmission is to be transmitted to a second network element, said first and second network elements in use both receiving said uplink transmission; and cause at least part of said received uplink transmission to be transmitted to said second network element.

The at least one memory and the computer code may be configured with the at least one processor to cause the apparatus to use information from at least one of said first and second network elements to determine how much of said received uplink transmission is to be transmitted The at least one memory and the computer code may be configured with the at least one processor to cause the apparatus to use a metric to determine how much of said received uplink transmission is to be transmitted The at least one memory and the computer code may be configured with the at least one processor to cause the apparatus to determine a metric and use said metric to determine how much of said received uplink transmission is to be transmitted.

The at least one memory and the computer code may be configured with the at least one processor to cause the apparatus to determine which of a plurality subframes of said received transmission is to be transmitted to a second network element.

The at least one memory and the computer code may be configured with the at least one processor to cause the apparatus to cause information to be transmitted, said information indicating which part of said received uplink transmission is to be transmitted to said second network element.

The second network element may comprise a serving cell.

The said metric may comprise at least one of: one or more subframe performance metrics; one or more of user equipment performance metrics; one or more of a backhaul capacity and utilization rate; and a number of network elements sending the received uplink transmission to the second network element.

One or more of the subframe performance metrics may comprise at least one of: a signal to noise ratio; a log-likelihood ratio; and path loss ratio at the second network element and said first network element.

One or more of the user equipment performance metrics may comprise an interference level and/or a path loss at the second network element and/or the first network element.

The at least one memory and the computer code may be configured with the at least one processor to cause the apparatus to process the received uplink transmission into N samples, and to determine that M samples are to be transmitted to said second network element, where M is less than N.

The at least one memory and the computer code may be configured with the at least one processor to cause the apparatus to receive M from said second network element.

The at least one memory and the computer code may be configured with the at least one processor to cause the apparatus to determine M in dependence on a quality of said received transmission.

The at least one memory and the computer code may be configured with the at least one processor to cause the apparatus to determine a quality of said received uplink transmission; and cause all of said received uplink transmission to be transmitted to said second network element in dependence of said determined quality.

According to another aspect, there is provided an apparatus comprising: means for determining in a first network element how much of a received uplink transmission is to be transmitted to a second network element, said first and second network elements both receiving said uplink transmission; and means for causing at least part of said received uplink transmission to be transmitted to said second network element.

The determining means may use information from at least one of said first and second network elements to determine how much of said received uplink transmission is to be transmitted The determining means may use a metric to determine how much of said received uplink transmission is to be transmitted The determining means may be for determining a metric and using said metric to determine how much of said received uplink transmission is to be transmitted.

The determining means may be for determining which of a plurality subframes of said received transmission is to be transmitted to a second network element.

The causing means may be for causing information to be transmitted, said information indicating which part of said received uplink transmission is to be transmitted to said second network element.

The second network element may comprise a serving cell.

The said metric may comprise at least one of: one or more subframe performance metrics; one or more of user equipment performance metrics; one or more of a backhaul capacity and utilization rate; and a number of network elements sending the received uplink transmission to the second network element.

One or more of the subframe performance metrics may comprise at least one of: a signal to noise ratio; a log-likelihood ratio; and path loss ratio at the second network element and said first network element.

One or more of the user equipment performance metrics may comprise an interference level and/or a path loss at the second network element and/or the first network element.

The apparatus may comprise processing means for processing the received uplink transmission into N samples, and said determining means is for determining that M samples are to be transmitted to said second network element, where M is less than N.

The apparatus may comprise receiving means for receiving M from said second network element.

The determining may determine M in dependence on a quality of said received transmission.

The determining means may be for determining a quality of said received uplink transmission; and causing all of said received uplink transmission to be transmitted to said second network element in dependence of said determined quality.

According to another aspect, there is provided an apparatus comprising at least one processor and at least one memory including computer code for one or more programs, the at least one memory and the computer code configured, with the at least one processor, to cause the apparatus at least to: transmit information to a first network element, said apparatus being in a second network element and said first and second network elements in use both receiving an uplink transmission, said information determining how much of said uplink transmission is to be provided by said first network element to said second network element; and receive at least a portion of said uplink transmission from said first network element.

The at least one memory and the computer code may be configured with the at least one processor to cause the apparatus to combine said at least a portion of said uplink transmission from said first network element with at least a portion of said uplink transmission received by said second network element.

According to another aspect, there is provided an apparatus comprising: means for transmitting information to a first network element, said apparatus being in a second network element and said first and second network elements in use both receiving an uplink transmission, said information determining how much of said uplink transmission is to be provided by said first network element to said second network element; and receiving at least a portion of said uplink transmission from said first network element.

The apparatus may comprise combining means for combining said at least a portion of said uplink transmission from said first network element with at least a portion of said uplink transmission received by said second network element.

Any of the apparatus may be provided in a network element. The network element may be a bases station.

According to another aspect, there is provided a method, comprising: accessing a calculated metric for reducing the amount of data needed to be transmitted over a backhaul to a serving cell from at least one or more coordinating cells; and selectively transmitting a portion of the uplink transmission over the backhaul to the serving cell based upon the metric.

The serving cell and at least one or more coordinating cells may be reception points.

The serving cell may combine and decode the received portion of the uplink transmission.

The metric may determine what portion of a plurality of subframes to be transmitted to a serving cell.

The metric may determine what amount of data to be sent to the serving cell.

The metric may calculated by the serving cell using information obtained from a serving cell.

The metric may be calculated by the at least one cooperating cell using information obtained from the at least one or more cooperating cells.

The coordinating cell may transmit a descriptor to the serving cell to identify the portion of the received subframe it is sending.

The metric used to calculate the amount of data may be at least one of: a plurality of subframe performance metrics; a plurality of user device performance metrics; a backhaul capacity and utilization rate; and a number of reception points participating in a coordinating set.

The plurality of subframe performance metrics may comprise: a signal to noise ratio; a log-likelihood ratio; or path loss ratio at the serving cell and at least one coordinating cells The plurality of user device performance metrics may comprise: an interference level and path loss at the serving cell and at least one or more coordinating cells;

The step of accessing a calculated metric may further comprise the steps of: interleaving and quantizing the received uplink transmission is into samples of a plurality of subframes; or dividing the subframe into N segments where N is an integer greater than X.

The step of accessing a calculated metric may further comprise the steps of: transmitting, by the serving cell a parameter (M≤N) requesting at the least one or more coordinating cells sends its best M segments of a received subframe; and transmitting by the at least one coordinating cells M together with a bitmap identifying the segment of the in which the parameter M is located.

The step of accessing a calculated metric may further comprise the step of: determining by each coordinating cells the number of segments M(t) to transmit to the serving base station, where M(t) is based upon the sending coordinating cell's own performance metric; and transmitting M(t) together with a bitmap identifying the segment in which the parameter M(t) is located.

The step of accessing a calculated metric may further comprise the steps of: transmitting by the serving cell a parameter k to each one or more coordinating cells wherein, the one or more coordinating base stations send k log-likelihood ratio samples in response to the request.

The step of accessing a calculated metric may further comprise the steps of: sampling a plurality of subframes from the received uplink transmission based upon a log-likelihood ratio; storing each log-likelihood ratio in an interleaved buffer; and sending identifying parameters so that a receiver will know where the k samples are located in the buffer.

According to another aspect there is provided an apparatus comprising: at least one processor; and at least one memory including computer program code, the at least one memory and the computer program code being configured to: access a calculated metric for reducing the amount of data needed to be transmitted over a backhaul to a serving cell from at least one or more coordinating cells; and selectively transmit a portion of the uplink transmission over the backhaul to the serving cell based upon the metric.

According to another aspect, there is provided a program storage device readable by a machine, tangibly embodying a program of instructions executable by the machine for performing operations, said operations comprising: accessing a calculated metric for reducing the amount of data needed to be transmitted over a backhaul to a serving cell from at least one or more coordinating cells; and selectively transmitting a portion of the uplink transmission over the backhaul to the serving cell based upon the metric.

The serving cell and at least one or more coordinating cells may be reception points.

The serving cell may combine and decode the received portion of the uplink transmission.

The metric may determine what portion of a plurality of subframes to transmit to a serving cell.

BRIEF DESCRIPTION OF THE DRAWINGS

The following discussion of some embodiments is made more evident in the following Detailed Description, when read in conjunction with the attached Figures, wherein:

FIG. 4D is an illustration of signal processing of a received UL signal from a UE at an eNB showing both I/Q sampling and log-likelihood ratio (LLR) sampling suitable for use in some embodiment;

FIG. 5 depicts a flowchart illustrating one non-limiting example of a method used in some embodiments;

FIG. 6 depicts a received subframe I/Q sampling suitable for use in some embodiments;

FIG. 7 depicts a received LLR buffer suitable for use in some embodiments; and

FIG. 8 is a graphically illustration of backhaul utilization and throughput of some embodiments.

DETAILED DESCRIPTION

Some embodiments provide apparatus, methods, and computer program(s) that allow for the reduction of bandwidth associated with the backhaul traffic in uplink (UL) coordinated multipoint (CoMP) reception among a plurality of reception points.

It should be appreciated that some embodiments may be used with other arrangements where data or the like is transmitted from one source and received at a plurality of different destinations.

Coordinated Multi-point (CoMP) transmission/reception (or cooperative MIMO) is currently being investigated in 3rd Generation Partnership Project (3GPP); Technical Specification Group Radio Access Network (TSG RAN1) within the evolution of LTE-Advance (LTE-A). More specifically, RAN1 is a working group that is responsible for investigating the specification of the physical layer of the radio interface for UE, UTRAN, Evolved UTRAN, and beyond, covering both FDD and TDD modes of the radio interface. UTRAN (E-UTRAN (also referred to as UTRAN-LTE or as E-UTRA) is a specification of a communication system which is currently nearing completion within the 3GPP. A short description and references to the relevant portions of the UTRAN and LTE-A specifications are set forth below, prior to a description of CoMP techniques and some embodiments.

One specification of interest is 3GPP TS 36.300, V8.12.0 (2010 April), 3GPP TSG RAN1; Evolved Universal Terrestrial Radio Access (E-UTRA) and Evolved Universal Terrestrial Access Network (E-UTRAN); Overall description; Stage 2 (Release 8), which is incorporated herein by reference in its entirety. This system may be referred to for convenience as LTE Rel-8 (which also contains 3G HSPA and its improvements). In general, the set of specifications given generally as 3GPP TS 36.xyz (e.g., 36.211, 36.311, 36.312, etc.) may be seen as describing the Release 8 LTE system. Release 9 versions of these specifications have been published, including 3GPP TS 36.300, V9.7.0 (2011 March), which is incorporated by reference herein in its entirety. Release 10 versions of these specifications have been published, including 3GPP TS 36.300, V10.4.0 (2011 June), which is incorporated by reference herein in its entirety.

Figure 1:
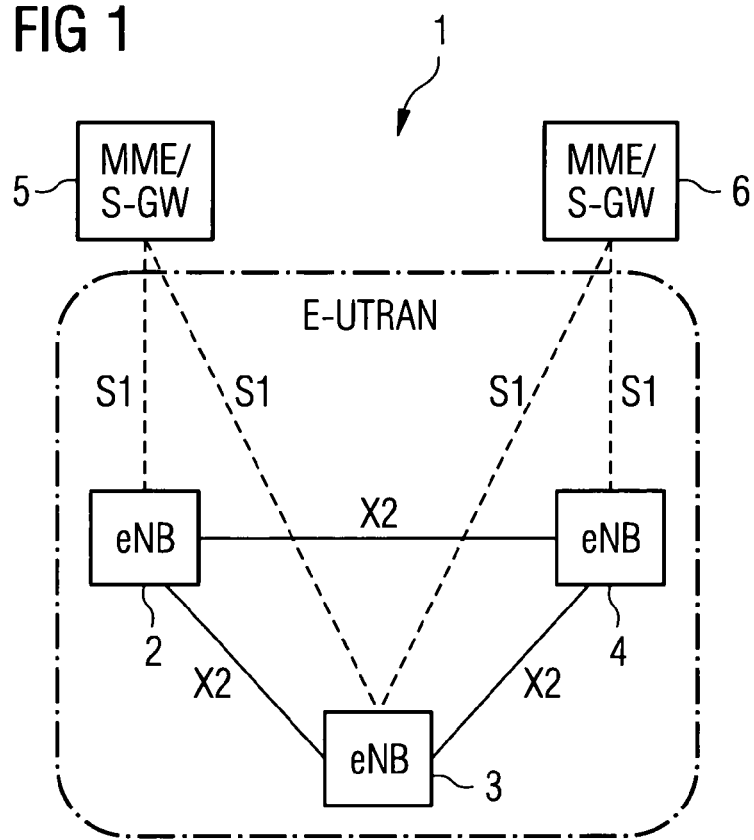
FIG. 1 reproduces drawing 4-1 of 3GPP TS 36.300 V8.12.0, and shows the overall architecture of an E-UTRAN system.

FIG. 1 reproduces drawing 4-1 of 3GPP TS 36.300 V8.12.0, and shows the overall architecture of a generic E-UTRAN system 2 (Rel-8). The E-UTRAN system 2 includes three eNBs; eNB 2, eNB 3 and eNB 4 which provides what is called the E-UTRAN user plane (PDCP/RLC/MAC/PHY) and the control plane (RRC) protocol terminations towards the UE (not shown). eNB 2, eNB 3 and eNB 4 are interconnected with each other by means of an X2 interface. The X2 "connection" shown in FIG. 1 is logical in nature. In other words, the architecture depicted in FIG. 1 is shown as a direct connection between eNodeBs, but in various implementations X2 connections may be physically routed through transport connections similar to the two S1 interface connections shown.

The S-1 interface connects to an Evolved Packet Core (EPC) which is the IP-based core network defined by 3GPP in Rel-8 for use by LTE and other access technologies. Two EPCs, EPC 5 and EPC 6 are shown in FIG. 1 and consist of a Mobility Management Entity (MME), a Serving Gateway (S-GW) that interfaces with the E-UTRAN and a Serving Gateway (S-GW) that interfaces to external packet data networks. The S-GWs route and forward user data packets among other tasks as defined by 3GPP TS 23.401. The S1 interface supports a many-to-many relationship between MMEs/S-GWs and eNBs.

The eNB hosts the following functions:
functions for remote radio management/control (RRM and RRC), Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);

scheduling and transmission of broadcast information (originated from the MME or O&M); and measurement and measurement reporting configuration for mobility and scheduling.

Additional reference is made to 3GPP TR 36.913, V8.0.1 (2009 March), 3GPP TSG RAN1 entitled "Requirements for Further Advancements for E-UTRA" (LTE-Advanced) (Release 8), incorporated by reference herein in its entirety. A goal of LTE-A is to provide significantly enhanced services by means of higher data rates and lower latency with reduced cost. LTE-A is directed toward extending and optimizing the 3GPP LTE Rel-8 radio access technologies to provide higher data rates at very low cost. LTE-A is part of LTE Rel-10. LTE-A is a more optimized radio system fulfilling the ITU-R requirements for IMT-A while maintaining backward compatibility with LTE Rel-8. Reference is further made to a Release 9 version of 3GPP TR 36.913, V9.0.0 (2009 December), incorporated by reference herein in its entirety. Reference is also made to a Release 10 version of 3GPP TR 36.913, V10.0.0 (2011 June), incorporated by reference herein in its entirety.

As mentioned above, coordinated multipoint (CoMP) transmission/reception is being investigated as an enhancement to the above described evolving mobile communication standard LTE-A. The motivation for CoMP is to allow fast coordination among different transmission points to improve coverage of high data rate, cell-edge throughput and/or to increase system throughput in LTE-A. For example, CoMP is being looked at as a way to overcome the burden of inter-cell interference which can occur in urban areas where cellular systems are densely deployed.

CoMP aims to achieve this by increasing collaboration between different transmission/reception points (e.g., base stations, repeaters, or hotspots, etc.) in both downlink (DL) transmissions and uplink (UL) reception from and to the UE simultaneously and on the same frequency resources. By coordinating and combining signals from multiple antennas, CoMP aims to make it possible for (but has not yet allowed) mobile users to enjoy consistent performance and quality when mobile users access and share videos, photos and other high-bandwidth services whether the mobile users are close to the center of an LTE-A cell or at its outer edges.

In DL and UL CoMP, the transmissions and reception from or to multiple cells are coordinated such as to mitigate inter-cell interference among the cells at the UE. This type of operation requires channel state information (CSI) feedback from the UE to the eNBs. The CSI feedback could take the form of, for example, a precoding matrix indication (PMI), or other form of CSI that allows weighting the eNB antennas in order to mitigate interference in the spatial domain. Also, a backhaul infrastructure is required to communicate data and control information received by each coordinated cell to the serving cell as described more fully below.

To enable closed-loop transmission from multiple transmission points to a given UE, CSI for multiple radio links is measured by the UE and sent to the network using an uplink control channel (PUCCH) or an uplink data channel (PUSCH). A UE in a CoMP scenario may be attached to a serving eNB and may communicate with that eNB for UL control (PUCCH), uplink data (PUSCH), and/or DL control (PDCCH) channels. For CoMP transmission, the UE can receive joint transmissions (PDSCH) from the serving eNB and/or one or more non-serving eNBs (e.g., from overlapping cells). The primary focus until now has been on DL CoMP. However some embodiments may provide an enhancement to UL CoMP.

Figure 2:
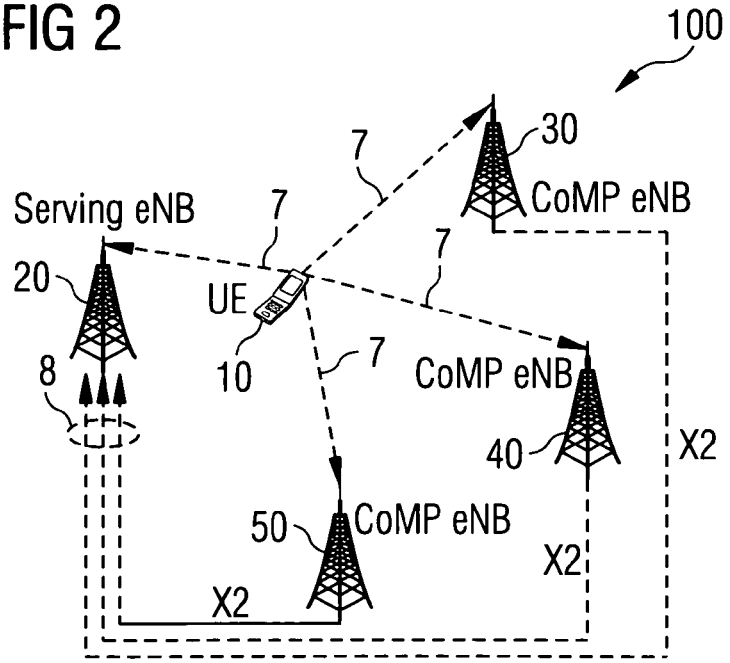
FIG. 2, illustrates a wireless telecommunications network that supports CoMP uplink (UL) reception.

Referring now to FIG. 2, a conventional wireless telecommunications network that supports CoMP uplink (UL) reception 100 is illustrated. More specifically, FIG. 2 shows an example of a single UL transmission 7 received simultaneously by a plurality of base station and the resulting backhaul 8 forwarding on an X2 interface to a single serving base station in a so-called "inter-site" CoMP deployment. In this illustration inter-site CoMP deployment involves a "CoMP group" (or "CoMP set") of four base stations as a reception point and proximately located to user equipment (UE) 10 as shown in FIG. 1. The number of base stations in a CoMP set is not limited to four but is merely shown here for simplicity. More or less than four base stations may be provided in a set. In FIG. 2, for example the CoMP set includes a serving cell, eNB 20 and three coordinating cells, eNB 30, eNB 40 and eNB 50. In this example, each reception point is a LTE Node B (base station), hence the notation "eNB." Alternatively, an intra-site CoMP deployment (not shown) could be utilized which would involve access points (e.g. base stations, repeaters, or hotspots, etc) co-located within the coverage area of eNB 20.

Figure 3:
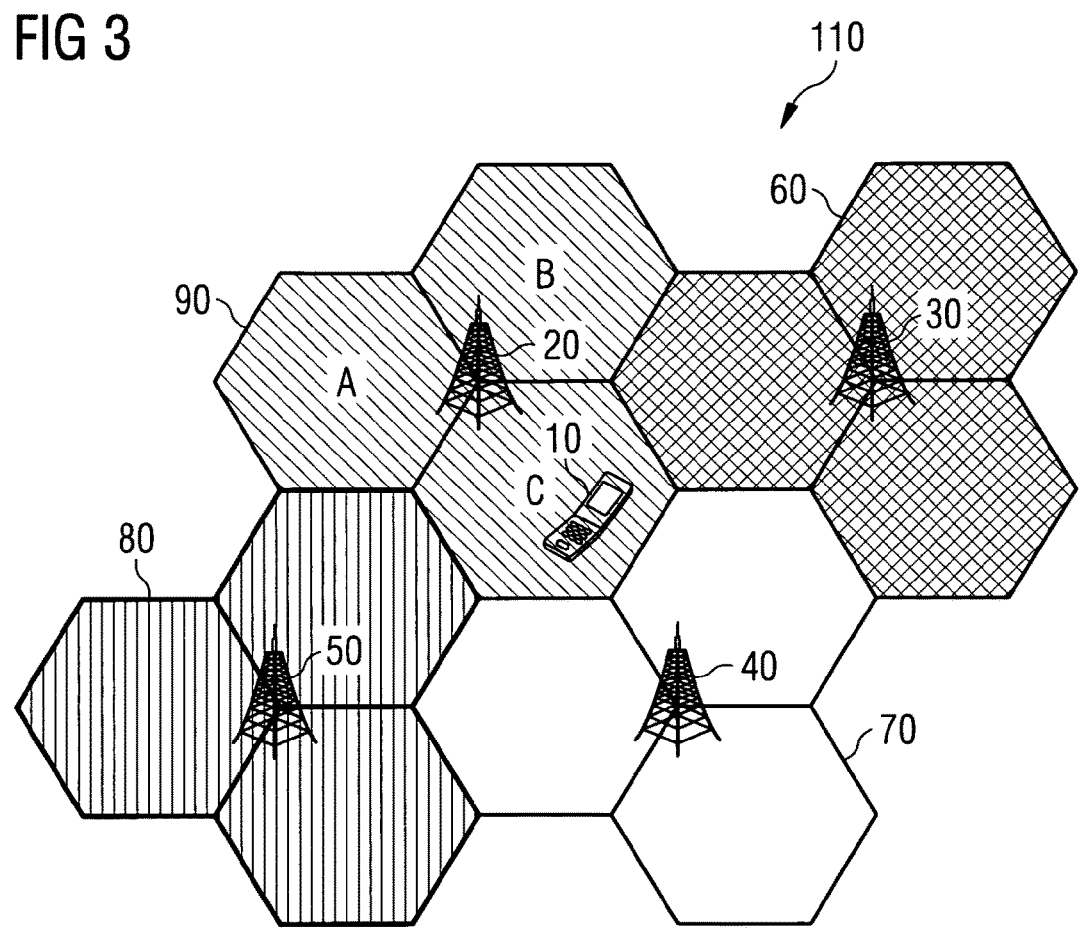
FIG. 3 is an illustration of coverage areas of the wireless telecommunications network of FIG. 2 to clarify the distinction between inter-site CoMP and intra-site CoMP.

FIG. 3 is an illustration of coverage areas of the wireless telecommunications network of FIG. 2 to clarify the distinction between inter-site CoMP and intra-site CoMP. In FIG. 2, UE 10 is located spatially in proximately to four base stations specifically eNB 20, eNB 30, eNB 40 and eNB 50. Each base station operates over a corresponding coverage area, 60, 70, 80 and 90. Moreover, each base station's coverage area is further divided into cells. For example, eNB 20 provides three cells A, B and C. UE 10 is located in cell C of eNB 20 and at the edge of the coverage areas of eNB 30, eNB 40 and eNB 50. Intra-site CoMP could occur if co-located reception points coordinated a UL reception (e.g. a hotspot (not shown) and/or a eNB (not shown) co-located with eNB 20 in cells A, B or C. On the other hand, inter-site CoMP can occur when eNB 20, eNB 30, eNB 40 and eNB 50 coordinate an UL reception in coverage areas 60, 70, 80 and 90.

Referring back to FIG. 2, eNB 20 is designated as the serving base station (or serving cell), while eNB 30, eNB 40 and eNB 50 are designated coordinating base stations coordinating cells. The term "cell" is used throughout this disclosure to emphasize the fact that the reception points are not limited in embodiments to a base stations such as a Node B (base station) (e.g., eNB) but can be any suitable access point such as a conventional GSM base station, a repeater, or hotspots and the like. In FIG. 2, each depicted base station receives simultaneously a UL signal 7 from UE 10. In other words the same signal transmitted by the UE is received by each of the base stations. In this example, the received UL data is thereafter forwarded by each coordinating cell eNB 30, eNB 40 and eNB 50 to the serving cell eNB 20. The forwarding of the UL data is transmitted by way of each base stations logical X2 interface 8 as discussed below. The X2 signals sent from each coordinating cell are combined at serving cell eNB 20 and referred to as the "backhaul" or backhaul traffic (110).

Figure 4:
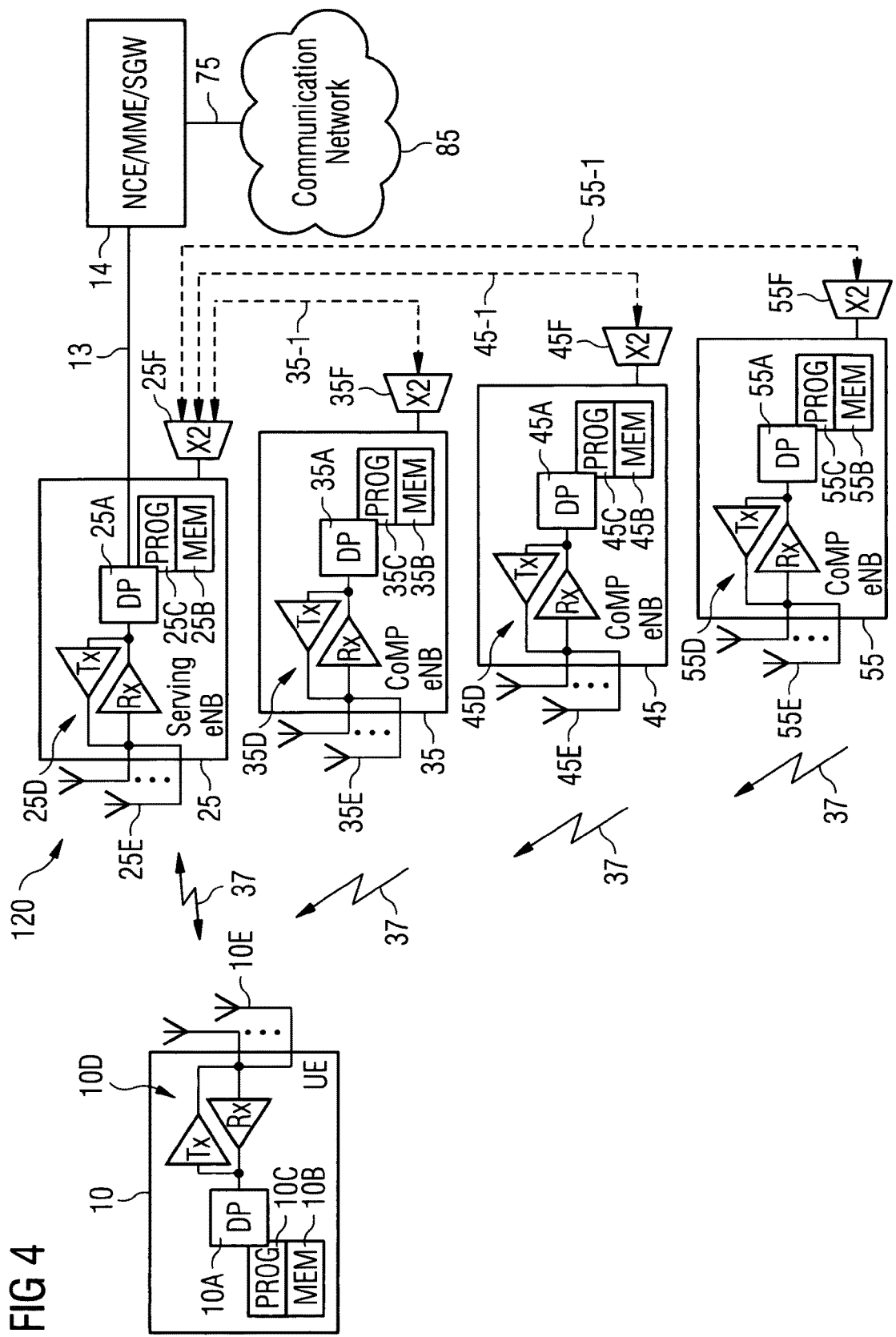
FIG. 4 shows a simplified block diagram of various example electronic devices that are suitable for use in practicing some embodiments.

Before describing in further detail some embodiments, reference is made to FIG. 4 for illustrating a simplified block diagram of various electronic devices and apparatus that are suitable for use in practicing some embodiments. In FIG. 4, a wireless network 120 is provides CoMP transmission and reception over a wireless link 37 with an apparatus, such as a mobile communication device which may be referred to as a user equipment (UE) 10, via one or more network access nodes, each referred to as Node B (base stations), or more specifically one or more eNBs. Furthermore, each eNB is further defined by its designation within the CoMP set as discussed above with respect to FIG. 2. Accordingly, the base stations have similar designations of serving cell eNB 25 and coordinating cells eNBs 35, eNBs 45 and eNBs 55. It may be noted that the base-stations 25, 35, 45, 55 as mentioned above may also represent individual reception points. A reception point is defined as a set of co-located receive antennas. Multiple reception points may belong to the same eNB. Multiple reception points may share a common cell-id. The network 120 may include a network control element (NCE) 14 that may include the MME/S-GW functionality which provides connectivity with one or more other networks 85, such as a telephone network and/or a data communications network (e.g., the Internet). The UE 10 includes a controller, such as a computer, processor or data processor (DP) 10A, a computer-readable memory medium embodied as a memory (MEM) 10B that stores a program of computer instructions (PROG) 10C, and a suitable radio frequency (RF) interface 10D for bidirectional wireless communications with the eNBs (25, 35, 45, 55) via one or more antennas 10E.

The eNB 25 includes a controller, such as a computer, processor or data processor (DP) 25A, a computer-readable memory medium embodied as a memory (MEM) 25B that stores a program of computer instructions (PROG) 25C, and a suitable radio frequency (RF) interface 25D for communication with the UE 10 via one or more antennas 25E. The eNB 25 is coupled via a data/control path 13 to the NCE 14. As a non-limiting example, the path 13 may be implemented as a S1 interface on eNB 25 (not shown) and path may typically be a fiber optic link employing any high speed protocol such as Fiber Channel, FDDI or SONET, a wire line link or a Micro Wave (MW) radio link.

In one particular embodiment, the eNB 25 is coupled to one or more other eNBs via one or more data/control paths 35-1, 45-1 and 55-1 provided between a X2 interface 25F at Serving eNB 25, and X2 interface 35F at CoMP eNB 35, X2 interface 45F at CoMP eNB 45 and X2 interface 55F at CoMP eNB 55. The X2 interface is implemented as a logical device in software or can be implemented in hardware as know to those skilled in the art. The RF interface 10D of the UE 10 and/or RF interfaces 25D, 35D, 45D and 55D of serving eNB 25, CoMP eNB 35, CoMP eNB 45 and CoMP eNB 55 may comprise one or more transmitters, one or more receivers and/or one or more transceivers, as non-limiting examples. In other embodiments, the RF interface 10D of the UE 10 and/or 25D, 35D, 45D and 55D of serving eNB 25, CoMP eNB 35, CoMP eNB 45 and CoMP eNB 55 may comprise one or more wireless interfaces and/or one or more communication components configured to perform unidirectional and/or bidirectional wireless communication with one or more other apparatus and/or devices.

At least one of the PROGs 10C, 25C, 35C, 45C, and 55C include program instructions that, when executed by the associated DP 10A, 25A, 35A, 45A, and 55A enable the respective device to operate in accordance with some embodiments, as will be discussed below in greater detail. That is, some embodiments may be implemented at least in part by computer software executable by the DP 10A of the UE 10 and/or by the DP 25A of the serving eNB 25, the DP 35A of the CoMP eNB 35, the DP 45A of the CoMP eNB 45 and/or the DP 55A of the CoMP eNB 55, by hardware, or by a combination of software and hardware (and firmware). Moreover, as discussed in greater detail below, the DP 25A of the serving eNB 25 may direct further actions (collectively) of the DP 35A of the CoMP eNB 35, the DP 45A of the CoMP eNB 45 and/or the DP 55A of the CoMP eNB 55

In general, the various embodiments of the UE 10 can include, but are not limited to, mobile nodes, mobile stations, mobile phones, smart phones, tablets, cellular phones, personal digital assistants (PDAs) having wireless communication capabilities, mobile routers, relay stations, relay nodes, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Figure 4A:
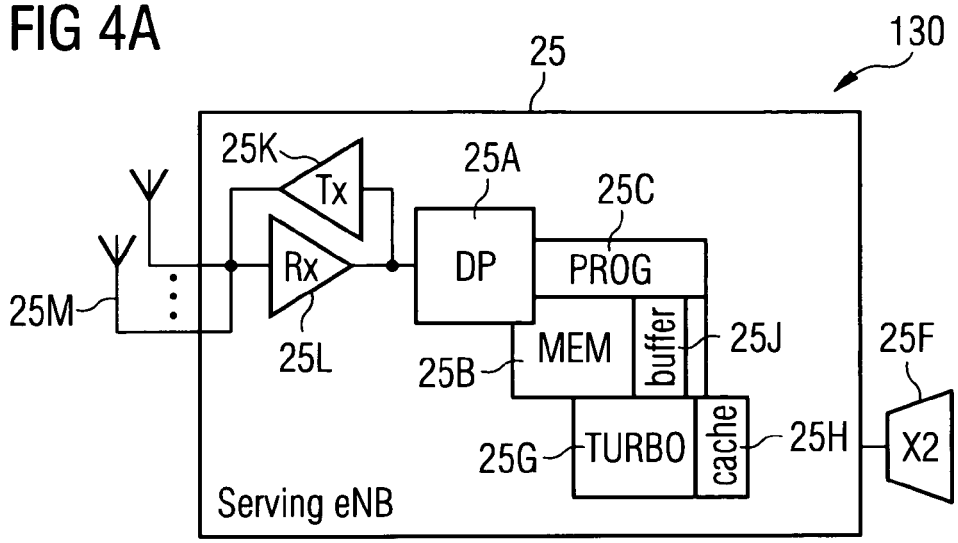
FIG. 4A is simplified block diagram which shows a more particularized block diagram of an example of a serving cell such as that shown in FIG. 3.
Figure 4B:
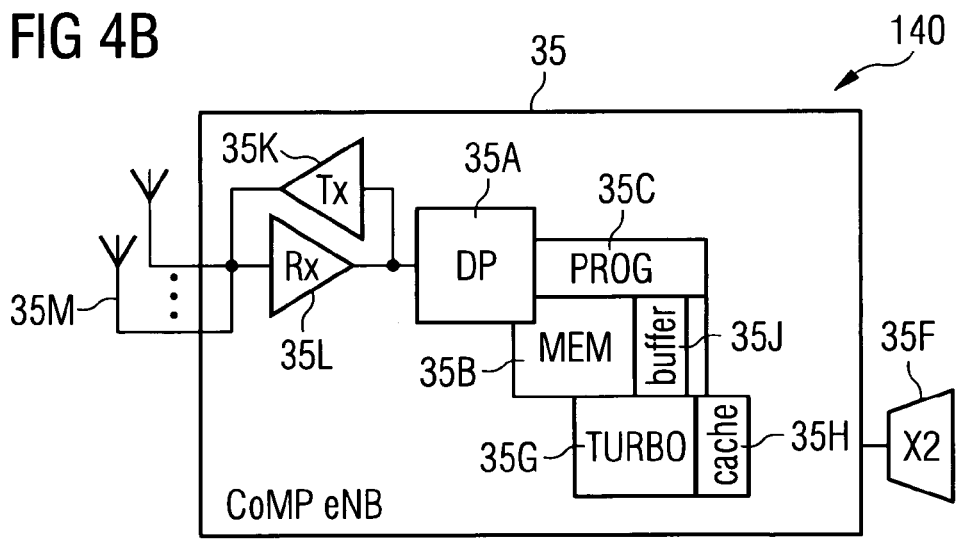
FIG. 4B is simplified block diagram which shows a more particularized block diagram of an example of a coordinating cell such as that shown in FIG. 3.

The MEMs 10B, 25B, 35B, 45B and 55B may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The DPs 10A, 25A, 35A, 45A, and 55A may be of any type suitable to the local technical environment, and may include one or more of general purpose computers, special purpose computers, microprocessors, digital signal processors (DSPs) and processors based on a multicore processor architecture, as non-limiting examples. Referring now to FIG. 4A 130 is a simplified block diagram of a serving eNB 25 capable of combining received UL CoMP signals, according to some embodiments. As show in FIG. 4A serving eNB 25 further including a turbo encoder/decoder 25G, a cache memory 25H, a buffer 25J for storing and/or combining data received at X2 interface 25F from one or more coordinating base stations, a transmitter 25K, a receiver 25L and an antenna 25M. FIG. 4B 140 is a simplified block diagram of a CoMP eNB capable of forwarding received UL CoMP signals to a serving eNB 25, according to some embodiments. As shown in FIG. 4B CoMP eNB 35, has a turbo encoder/decoder 35G, a cache memory 35H, a buffer 35J for storing data received from the UE, a transmitter 35K, a receiver 35L and an antenna 35M.

Figure 4C:
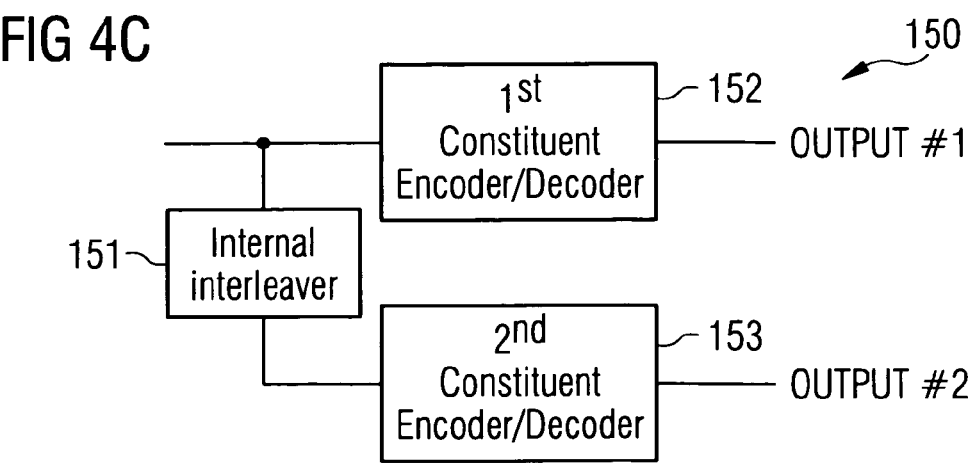
FIG. 4C is an illustration of a more particularized block diagram of an example turbo decoder/encoder such as that shown in FIGS. 4A and 4B.

Referring now to FIG. 4C a simplified block diagram of a turbo encoder/decoder is shown according to some embodiments. As shown in FIG. 4C, the turbo encoder/decoder comprises an internal interleaver 151 and two parallel concatenated convolutional encoders/decoders 152 and 153. These two parallel concatenated convolutional encoders/decoders 152 and 153 are connected to the interleaver 151 and operate as constituent encoders. In operation, data is fed into the first constituent encoder/decoder 152 in the received order while simultaneously being fed into the second constituent encoder/decoder 152 in an interleaved order. Accordingly output #1 comprises a data sequence in natural order while output #2 comprises the interleaved data sequence.

In FIG. 4D, is an illustration of signal decomposition/recomposition of a UL signal received from an UE at an eNB showing both I/Q sampling and LLR sampling according to some embodiments. It should be appreciated that each block can be considered to represent a function. Each function may represent a physical processing block and/or processing step. As shown in FIG. 4D, a signal from a UE is received at antenna 610 and one or more of the other antennas 610N (not shown). The carrier frequency component is separated or removed from the received signal by separators 615/615N. These separators may for example be mixers and may down convert the received signal to the baseband.

The output of the separators 615/615N are respectively fed into an I/Q detector 620/620N which coordinates the decomposition of the received signal with an Automatic frequency control (AFC) recovery clock 625/625N. The I/Q detector separates the signal into respective I and Q component parts. Thereafter, the cyclical preamble is removed by Cyclic prefix (CP) remover 630/630N from the respective I and Q component parts.

The I and Q data is then transformed from the time domain to the frequency domain by applying a fast Fourier Transformation (FFT) by a respective FFT function 640/640N. Finally, the desired transformed signal is extracted by a mapping function 650/650N from specific resource blocks (not shown). Accordingly the respective processed I/Q samples 660 are fed into processor 670 which combines or otherwise processes the I/Q sampling using a channel estimate provided by a channel estimator 672.

On the other hand, a LLR sample 680 is obtained by outputting the processed I/Q samples to an equalizer 674 along with a channel estimate from the channel estimator. This equalizes the samples. An inverse transform is then applied by an M-Point IFFT Function 682. This is followed by applying a symbol demapping by a symbol demapper 684 and then descrambling a subframe by a descrambler 686. This provides the LLR sample. The LLR sample 680 is further processed by a de-rate matching function 688 prior to being decoded by a decoder 690. As known by those skilled in the art signal decomposition/recomposition can involve more or less signal process such as filter banks and additional pre and post processing depending on the specific hardware/software of a reception point (e.g. eNB).

Below are provided further descriptions of various non-limiting, embodiments which provide methods and/or computer program(s) that may allow for the reduction of bandwidth associated with the backhaul in uplink (UL) coordinated multipoint (CoMP) reception among a plurality of reception points.

In some embodiments, and with reference to FIG. 5, a method provides the following steps to reduce backhaul traffic in UL reception in CoMP. One possible step comprises forming a coordination set by designating a serving cell (e.g. eNB) and one or more coordinating cells among a plurality of reception points (e.g. eNBs)(501). In general a coordination set is comprised of a set of reception points. The reception points may belong to one or more cells and/or eNBs. For example as shown is FIG. 4, one non-limiting example could include four eNBs coordinating reception of an UL signal 37 from UE 10. In this case, eNB 25 is designated as the serving cell while eNB 35, eNB 45, and eNB 55 are designated as coordinating cells.

After the coordination set is established, in some embodiments the method requires that a metric be calculated to reduce the amount of data needed to be transmitted over a backhaul to a serving cell from the one or more coordinating cells (502).

Then, a portion of the uplink transmission or a portion of the data obtained via processing the uplink transmission is selectively transmitted over a backhaul to the serving base station based upon the metric (503).

The serving cell thereafter combines and decodes the received portion of the uplink transmission (505). For example, FIG. 4 illustrates the transmission of a backhaul over the X2 interfaces between eNB 25, eNB 35, eNB 45, and eNB 55. As shown in FIG. 4, the X2 interfaces 35F, 45F and 55F transmit data along paths 35-1, 45-1 and 55-1 to the X2 interface 25F of eNB 25.

In the above described method, the metric can be determined based upon a description of a portion of a plurality of subframes (of the UL signals) received by the coordinating cells, where the subframes represent a sampling of the UL signals simultaneously received by the coordinating and serving cells from user equipment. This information can be calculated by the serving cell using information obtained by the serving cell. Alternatively or additionally, the metric can be calculated using information obtained from at least one or more coordinating cells. Accordingly, the coordinating cells can transmit a descriptor to the serving cell to identify the portion of the received subframe which is being sent to the serving cell along with the data in the received UL signal.

Alternatively or additionally, the above method can determine a metric based upon what amount of data to be sent to the serving cell. In such an embodiment, the method would calculate the amount of data based upon a plurality of subframe performance metrics. The following non-limiting examples could be employed such as, a signal to noise ratio, log-likelihood ratio or pathloss ratio at the serving base station and coordinating base stations. Alternatively or additionally another possible performance metric could include at least one of a user equipment performance metrics including interference level and pathloss at the serving cell and coordinating cells. Alternatively or additionally, another performance metric could include a specific backhaul capacity, a utilization rate and/or the number of base stations participating in the coordinating set.

The above described embodiment of calculating the amount of data based upon a plurality of subframe performance metrics can be performed by the serving cell and/or the at least one coordinating cells. In the case where the serving cell calculates the metric, a further step would include sending a request to at least one or more coordinating cells requesting that they each send a specific amount of data based upon the calculated metric. Alternatively or additionally, the at least one or coordinating cells can calculate the amount of data based upon a plurality of subframe performance metrics. In the case where the coordinating cell calculates the metric, a further step would include sending a specific amount of data to the serving cell based upon the calculated metric. Compression can be used to further reduce the amount of data to be transmitted to the serving cell which can be done on top of this method.

As described above, one possible method of reducing bandwidth associated with the backhaul in uplink (UL) coordinated multipoint (CoMP) reception among a plurality of reception points could include sampling of received UL subframes. That step could further include steps of interleaving and quantizing the received uplink transmissions into samples of a plurality of subframes and dividing the subframe into N segments where N is an integer greater than X. X is a number or threshold which can be set as required. For example, X can be set by the serving cell. An example of this decomposition process is shown in FIG. 4D, where interleaved/quantized sampling 660 results from UL signals received at antenna 610 and 610N. FIG. 6 is an illustration of a subframes received by a coordination set 200. As shown in FIG. 6, the subframe I/Q sampling 210 include for example six defined segments 220, which are 230, 231, 232, 233, 234, 235. The number of segments may be more or less than six. The size of the sampling is only limited by the buffer contained in memory of the base station. For example, as shown in FIGS. 4A and 4B, the memories 25B and 35B contain buffers 25J and 35J.

Another possible embodiment could provide a method where the serving cell transmits a parameter $M(M \leq N)$ requesting each coordinating cell sends its best M segments 220 of the received subframe 210. As shown in FIG. 4C, a turbo encoder/decoder can be employed to encode the parameter at coordinating cells and decode the parameter at the serving cell as known in the art. The encoded parameter M together would thereafter be transmitted with a bitmap identifying the segment in which each are located for the purposes of decoding. A local cache memory 25H/35H as shown in FIGS. 4A and 4B can be employed in this step to further assist in ordering the raw data into and out of the turbo decoders. Compression can be used to further reduce the amount of data to be transmitted to the serving cell which can be done on top of this method.

An alternative embodiment could provide that each coordinating cell independently determines the number of segments M(t) to be sent to the serving cell. This determination could be based upon the sending coordinating cell's own performance metric. For example, based upon the coordinating cells signal interference-plus-noise ratio (SINR) (e.g. the higher the received SINR the smaller the M(t). In addition to sending the parameter M(t) to the serving cell, each coordinating cell would transmit a bitmap identifying the segment for the purposes of decoding. In other words, a coordinating cell may decide that the received data is so poor that it is unlikely to help and therefore discard the data without sending over the backhaul.

Yet another embodiment could provide a method further comprising the steps of transmitting by the serving cell a parameter k to each one or more coordinating cells. The coordinating cells in response to this request would send k log-likelihood ratio (LLR) samples in response to the request. For example, as shown in FIG. 7, a buffer contains LLR samples 320 derived from an UL signal from a user equipment 300. The number of LLR samples may be determined by the size of the buffer (e.g. buffers 25J and 35J as shown in FIGS. 4A and 4B). FIG. 4D provides an illustration of an example of the recomposition of an LLR sampling signal 680 by an eNB. Referring again to FIG. 4C, a turbo encoder/decoder can be employed to encode the parameter k at the coordinating cells and decode the parameter at the serving cell as known in the art. The encoded parameter k would be decoded based upon known rate-matching pattern and random starting points. A local cache memory as shown in FIGS. 4A and 4B can be employed in this step to further assist in ordering the raw data into and out of the turbo decoders.

An alternative embodiment could provide that each coordinating cell independently determines the number of LLR samples k(t) to transmit to the serving cell. The parameter k(t) can be based upon each coordinating cell's performance metric (e.g. the higher the LLR reliability metric, the smaller k(t). In this embodiment, LLRs for the systematic bits are prioritized in k(t). When systematic LLR sample bits are exhausted, parity bit LLR samples following puncture patterns can be prioritized for each coordinating cell. Compression can be used to further reduce the amount of data to be transmitted to the serving cell which can be done on top of this method. The systematic bits may be the original input bits and the parity bits are generated by the encoder to help with decoding. Yet another embodiment can provide that each cell in the CoMP set independently attempts to decode the packet received from the UL signal. In this case, if any cell successfully decodes the packet, it sends an ACK indicator to the serving cell together with the successfully decoded packet. Should this not occur in a predetermined time period, the serving cell could ask for data from the coordinating cells in either of the above described methods.

Some of the above embodiments may use a calculated metric. It should be appreciated alternatively or additionally other information may be used to determine how much of an uplink transmission is to be sent to the serving cell. For example one or more thresholds may be used. In other embodiments, the behavior may depend for example one or more of the time of day, the identity of the user, the type of call, the position of the user equipment or the like, Any of the above methods may be implemented as (i.e., performed by) a computer program. Any of the above methods may be implemented as a computer program stored (e.g., tangibly embodied) on a computer-readable medium (e.g., a program storage device, a memory). Some embodiments may be implemented by a computer program comprising computer program instructions that, when loaded in a processor, perform operations according to one or more (e.g., any one) of the above-described methods. Any of the above methods may be A method as in any above, implemented as a program of instructions tangibly embodied on a program storage device, execution of the program of instructions by a machine (e.g., a processor or a data processor) resulting in operations comprising the steps of the method. Any one of the above methods may comprise one or more aspects of one or more of the embodiments as described elsewhere herein, and, in particular, one or more aspects of the one or more embodiments as relating to one or more methods described herein.

Referring now to FIG. 8, the performance of some embodiments are shown in comparison to the prior art. In particular, compared to a conventional UL CoMP scheme as shown in FIG. 2 which for example employs I/Q soft combining where raw but quantized received signals from multiple cells are combined. As shown in FIG. 2, with 4 RX antennas and 10 MHz bandwidth, a backhaul requirement of 1.5 Gbps is required to transmit raw I/Q data to the serving eNB 20. This required data rate can be relaxed if some latency is permitted. However, since the serving eNB 20 must process the received signals and transmit an acknowledgement to the UE within 3 ms, the required backhaul data rate is still quite high. As shown in FIG. 8, in the case where UL CoMP is not employed user throughput is 2 Mbps.

Alternatively, employing the CoMP techniques described above increases to 5.3 Mbps when three eNBs are part of the CoMP set. As can be seen in FIG. 8 UL CoMP gain is a function of backhaul utilization when data reduction techniques are used. In this case, 100% utilization refers to when every LLR samples are transmitted from the two coordinating cells to the serving cell. In addition, centralized coordination at the serving cell is assumed. Here, the serving cell first calculates the amount of data required to successfully decode the packet (the parameter k discussed above) and then sends that request out to the coordinating cells. From the results, it is seen that backhaul utilization can be reduced by 30% to achieve the same user throughput. Furthermore, the method can be adapted such that the throughput increases with the available backhaul. For example, using only 10% of the normal backhaul can still increase the user throughput by 1 Mbps.

Some embodiments may be provided a program storage device, wherein the program storage device comprises a computer-readable medium, a computer-readable memory, a memory, a memory card, a removable memory, a storage device, a storage component and/or a storage circuit. Some embodiments may be provided by a program storage device, further comprising one or more aspects of some embodiments as described elsewhere herein, and, in particular, one or more aspects of some embodiments as relating to some methods described herein.

Some embodiments, as discussed above and as particularly described with respect to some methods, may be implemented as a computer program product comprising program instructions embodied on a tangible computer-readable medium. Execution of the program instructions results in operations comprising steps of utilizing some embodiments or steps of the method.

The embodiments, as discussed above and as particularly described with respect to some methods, may be implemented in conjunction with a program storage device (e.g., a computer-readable medium, a memory) readable by a machine (e.g., a computer, a mobile station, a mobile device, a mobile node), tangibly embodying a program of instructions (e.g., a program, a computer program) executable by the machine (e.g., by a processor, by a processor of the machine) for performing operations. The operations comprise steps of utilizing the exemplary embodiments or steps of the method.

The various blocks shown in FIGS. 4, 4A-4D may be viewed as method steps, as operations that result from operation of computer program code and/or as one or more coupled components (e.g., function blocks, circuits, integrated circuits, logic circuit elements) constructed to carry out the associated function(s). The blocks may also be considered to correspond to one or more functions and/or operations that are performed by one or more components, apparatus, processors, computer programs, circuits, integrated circuits, application-specific integrated circuits (ASICs), chips and/or function blocks. Any and/or all of the above may be implemented in any practicable arrangement or solution that enables operation in accordance with the exemplary embodiments.

Furthermore, the arrangement of the blocks shown in FIGS. 4, 4A-4C should be considered merely exemplary and non-limiting. It should be appreciated that the blocks may correspond to one or more functions and/or operations that may be performed in any order (e.g., any practicable, suitable and/or feasible order) and/or concurrently (e.g., as practicable, suitable and/or feasible) so as to implement one or more of the exemplary embodiments. In addition, one or more additional steps, functions and/or operations may be utilized in conjunction with those illustrated in FIG. 4, 4A-4D so as to implement one or more further exemplary embodiments, such as those described in further detail herein. That is, the non-limiting, exemplary embodiments shown in FIGS. 4, 4A-4C may be implemented, practiced or utilized in conjunction with one or more further aspects in any combination (e.g., any combination that is practicable, suitable and/or feasible) and are not limited only to the blocks, steps, functions and/or operations illustrated in FIGS. 4, 4A-4D.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments may be practiced in various components such as integrated circuit chips and modules, and that the exemplary embodiments may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments.

Various modifications and adaptations to the foregoing exemplary embodiments may become apparent to those skilled in the relevant arts in view of the foregoing description, when read in conjunction with the accompanying drawings. However, any and all modifications will still fall within the scope of the non-limiting and exemplary embodiments. For example, while the exemplary embodiments have been described above in the context of the E-UTRAN (UTRAN-LTE) system, it should be appreciated that the exemplary embodiments are not limited for use with only this one particular type of wireless communication system, and that they may be used to advantage in other wireless communication systems such as, for example, (WLAN, UTRAN, GSM as appropriate). Different embodiments may be used with different standards.

Different embodiments may be used with different versions of the mentioned standards. It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical region (both visible and invisible), as several non-limiting and non-exhaustive examples.

Further, the various names used for the described parameters (e.g. M(M≤N), M(t) k,k(t), etc.) are not intended to be limiting in any respect, as these parameters may be identified by any suitable names. Further, the formulas and expressions that use these various parameters may differ from those expressly disclosed herein.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controllers, other computing devices and/or some combination thereof.

The exemplary embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings. However, all such and similar modifications of the teachings of this invention will still fall within the scope of the non-limiting and exemplary embodiments of this invention.

Furthermore, some of the features of the various non-limiting and exemplary embodiments may be used to advantage without the corresponding use of other features. As such, the foregoing description should be considered as merely illustrative of the principles, teachings and exemplary embodiments of this invention, and not in limitation thereof.

The invention claimed is:

1. A method comprising:
   determining, by using a metric, in a first network element a part of a received uplink transmission to be transmitted to a second network element, said first and second network elements both receiving said uplink transmission; and
   transmitting the determined part of said received uplink transmission to said second network element.

2. The method according to claim 1, wherein the transmitting comprises information indicating which part of said received uplink transmission is to be transmitted to said second network element.

3. The method according to claim 1, wherein said second network element comprises a serving cell.

4. The method according to claim 1
   wherein said metric comprises at least one of:
   at least one subframe performance metric,
   at least one user equipment performance metric,
   at least one a backhaul capacity and a utilization rate, or
   a number of network elements sending the received uplink transmission to the second network element.

5. The method according to claim 4, wherein the at least one subframe performance metric comprises at least one of:
   a signal to noise ratio, log-likelihood ratio, or a path loss ratio at the second network element and said first network element.

6. The method according to claim 4, wherein the at least one user equipment performance metric comprises at least of one of:
   an interference level or a path loss at the second network element and the first network element.

7. The method according to claim 1, further comprising:
   processing the received uplink transmission into N number of samples, and said determining comprises determining that M number of samples are to be transmitted to said second network element, where the M number of samples is less than the N number of samples.

8. The method according to claim 7, comprising at least one of receiving the M number of samples from said second network element, and determining the M number of samples at said first network element in dependence on a quality of said received transmission.

9. An apparatus comprising:
   at least one processor; and
   at least one memory including computer code for one or more programs;
   the at least one memory and the computer code configured, with the at least one processor, to cause the apparatus at least to determine, by using a metric, in a first network element a part of a received uplink transmission to be transmitted to a second network element, said first and second network elements in use both receiving said uplink transmission; and
   transmit the determined part of said received uplink transmission to said second network element.

10. The apparatus according to claim 9, wherein the at least one memory and the computer code are configured with the at least one processor to cause the apparatus to:
    determine the metric, or
    determine which of a plurality subframes of said received transmission is to be transmitted to the second network element.

11. The apparatus according to claim 9, wherein the transmission comprises information indicating which part of said received uplink transmission is to be transmitted to said second network element.

12. The apparatus according to claim 9, wherein the at least one memory and the computer code are configured with the at least one processor to cause the apparatus to:
    determine the metric,
    wherein the metric comprises at least one of:
    at least one subframe performance metric,
    at least one user equipment performance metric,
    at least one of a backhaul capacity and utilization rate, or
    a number of network elements sending the received uplink transmission to the second network element.

13. The apparatus according to claim 12, wherein the at least one subframe performance metric comprises at least one of a signal to noise ratio, a log-likelihood ratio, or a path loss ratio at the second network element and said first network element, or
    wherein the at least one user equipment performance metric comprises at least one of an interference level, a path loss at the second network element, or the first network element.

14. The apparatus according to claim 9, wherein the at least one memory and the computer code are configured with the at least one processor to cause the apparatus to:
    process the received uplink transmission into N number of samples, and to determine that M number of samples are to be transmitted to said second network element, where the M number of samples is less than the N number of samples.

15. The apparatus according to claim 14, wherein the at least one memory and the computer code is configured with the at least one processor to cause the apparatus to:
    receive the M number of samples from said second network element, or
    determine the M number of samples in dependence on a quality of said received transmission.

16. A base station comprising an apparatus as claimed in claim 9.

17. The method of claim 1, further comprising at least one of the following:
    determining the metric, or
    determining which of a plurality subframes of said received transmission is to be transmitted to the second network element.

* * * * *